United States Patent [19]

Herweg et al.

[11] 3,951,717
[45] Apr. 20, 1976

[54] PROCESS FOR MAKING A LAMINATE HAVING A FOAM CORE

[75] Inventors: Peter Herweg, Burscheid; Roland Guse, Leverkusen, both of Germany

[73] Assignee: Bayer Aktiengesellschaft, Leverkusen, Germany

[22] Filed: Aug. 30, 1974

[21] Appl. No.: 501,903

[30] Foreign Application Priority Data
Sept. 13, 1973 Germany............................ 2346131

[52] U.S. Cl.................... 156/79; 264/45.8; 264/46.1; 264/46.2; 428/71; 428/117; 428/310
[51] Int. Cl.².......................................... B32B 5/20
[58] Field of Search.................. 264/54, 46.2, 46.3, 264/46.1, 45.8; 156/78, 79, 210; 428/117, 71, 119, 120, 310

[56] References Cited
UNITED STATES PATENTS

| | | |
|---|---|---|
| 2,648,619 | 8/1953 | Alderfer............................. 264/46.3 |
| 2,677,496 | 5/1954 | Maynes.............................. 156/210 |
| 2,797,729 | 7/1957 | Runton................................ 156/79 |
| 3,007,205 | 11/1961 | House................................ 264/46.3 |
| 3,200,026 | 8/1965 | Brown................................ 156/79 |
| 3,251,092 | 5/1966 | Printz................................. 264/54 |
| 3,257,483 | 6/1966 | Eberle................................ 156/79 |
| 3,537,929 | 11/1970 | Keith et al......................... 264/46.3 |
| 3,666,590 | 5/1972 | Susuki et al....................... 156/210 |
| 3,741,859 | 6/1973 | Wandel.............................. 156/210 |

*Primary Examiner*—Edward G. Whitby
*Attorney, Agent, or Firm*—Lawrence S. Pope; Gene Harsh

[57] ABSTRACT

A process is provided for the continuous production of a laminated product having a foam core between two substantially impermeable cover sheets one of which has longitudinally extending, transversely spaced inwardly directed recesses therein wherein a porous web is placed over the sheet having the recesses and a foamable liquid reaction mixture is poured over the web whereby only a part of the foamable reaction mixture passes through the web into the recesses.

6 Claims, 2 Drawing Figures

PROCESS FOR MAKING A LAMINATE HAVING A FOAM CORE

This invention relates to a process for the continuous production of a laminate having a lower cover layer formed with recesses, such as corrugations, a rigid foam core, and an upper cover layer, the cover layers being introduced into a double conveyor belt while a foamable mixture is distributed over the lower layer at the inlet end of the double conveyor belt.

Whereas the continuous production of laminates having spaced plane-parallel cover layers on both sides and a foam core does not involve any particular difficulties, the flow paths of the foam are uncontrollable in cases where a lower cover layer provided with recesses is used. In many cases, the upper cover layer of such a laminate is uneven, its adhesion to the foam core is inadequate and the quality of the foam is highly irregular. Attempts have been made to fill these recesses with foam in a preliminary operation. Unfortunately, this involves considerable extra outlay. Moreover, the danger of delamination exists at the interface between the two foam layers.

An object of this invention is to provide a process for making a product that is satisfactory in regard to evenness of the upper cover layer, adhesion of the cover layers to the hard foam core and homogeneity of the hard foam core.

Another object of the invention is to provide a laminated structure having substantially non-porous sheets bound to opposite sides of a synthetic resinous foam core wherein one of the sheets has longitudinally extending laterally spaced inwardly directed recesses substantially filled with a foam.

The foregoing objects and others are accomplished in accordance with this invention, generally speaking, by providing a process wherein a defoamable substantially impermeable sheet is moved continuously over rolls to form longitudinally extending laterally spaced grooves or corrugations therein, the resulting corrugated sheet is passed to the lower of two vertically spaced moving endless belts forming a continuous conveyor, a continuous permeable web is disposed over the surface of the recessed sheet, a foamable liquid is poured over the surface of the web, a substantially impermeable cover sheet is disposed over the resulting foaming mass and the assembly is then passed between the lower and an upper endless belt of the conveyor. The distance between the two belts and the volume of the liquid foamable mixture deposited on the web are coordinated so that there is sufficient foamable mixture to rise to a point where the upper sheet of the resulting sandwich structure is disposed against the upper belt as it is moved along by the conveyor. It has been found that foamable liquid will pass through the permeable web into the recesses and react to fill the grooves in the corrugated sheet while foaming reaction mixture above the web will expand to fill the space between the web and top cover sheet to form a substantially homogeneous core.

The cover sheets may be any suitable material such as, for example, metal, plastic, paper, fabric or the like.

Only some of the mixture applied to the permeable sheet or web penetrates through the sheet, while the remainder adheres to the sheet. In this way, the entire quantity of mixture required, although applied in a single operation, is introduced in a controlled amount into the recesses so that the mixture foaming in the recesses is subsequently unable to penetrate through the permeable sheet or can only penetrate through it to a limited extent because in the meantime the mixture that has adhered to the sheet has also begun to react and, in doing so, forms a foam barrier. It is obvious that the permeability of the sheet has to be adapted according to a number of parameters, such as the rate of advance of the double conveyor belt, the quantity of mixture applied per unit of time and per unit area, the viscosity of the mixture, the reaction velocity of the mixture and the volume of the recesses. The most suitable width of the openings in the permeable sheet is best determined in empirical tests.

The interfoaming of woven fabrics, nonwoven fabrics or the like in the case of double laminates is, of course, already known. In known applications, however, these inserts are used to reinforce the laminate and not to control the foaming process.

Any suitable sheet or web which is permeable to a liquid foamable reaction mixture may be used. The sheet is preferably fixed to the lower cover layer at the raised points or lands between the recesses. In this way the sheet is prevented from being displaced during the foaming operation.

Examples of suitable permeable sheets include a perforated film, a mesh fabric, a knitted fabric or a coarse fiber-based nonwoven fabric.

One embodiment of the invention is described by way of example in the following with reference to the accompanying drawing, wherein.

Figure 1:
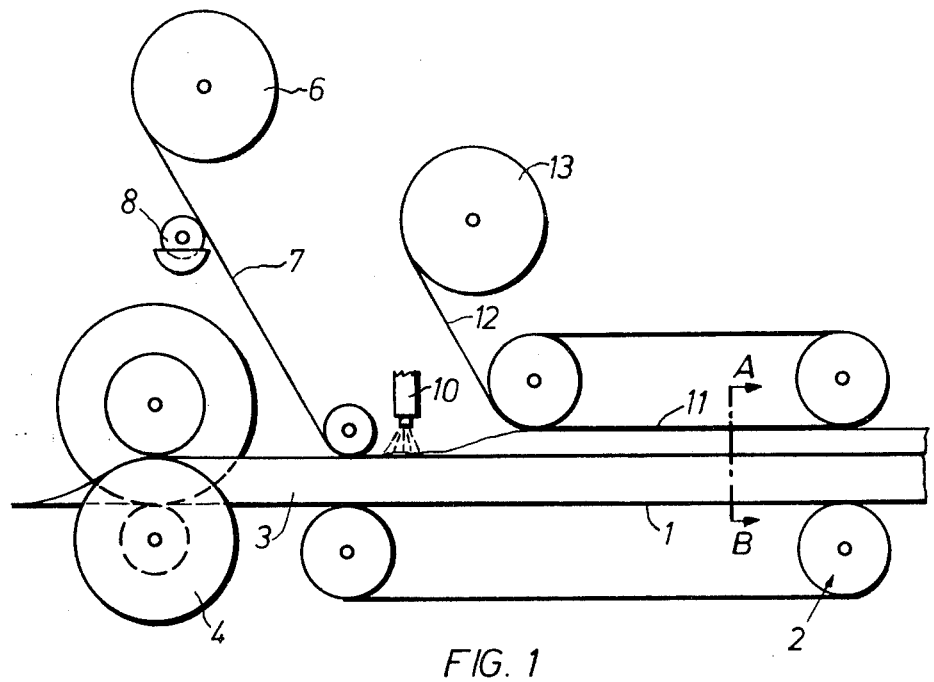
FIG. 1 is a diagrammatic side elevation of a double conveyor belt.
Figure 2:
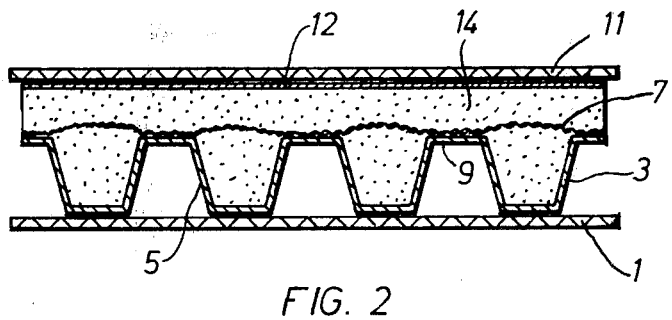
FIG. 2 is a section on the line A–B of FIG. 1.

A lower metal cover layer 3 is provided with longitudinal corrugations 5 by corrugating unit 4. The corrugated metal sheet 3 is placed on the lower belt 1 of a double conveyor belt 2. A sheet 7 of jute having a mesh width of around 4 mm is run off from a supply roll 6. A roll applicator 8 applies stripes of adhesive to the sheet 7 of jute fabric at those points which come into contact with the lands 9 between the corrugations 5. The width of the lands 9 between the corrugations 5 is approximately 13 mm. The corrugations are 80 mm deep. There are four corrugations 5 across the width of the cover layer. A foamable reaction mixture containing a polyol, an isocyanate, and small quantities of expanding agent and other additives, for example, for increasing fire resistance, is applied by means of a reciprocating coating unit 10. Part of the mixture flows through the meshes of the jute fabric into the corrugations 5, while the rest remains on the lands 9 and, in particular, over the corrugations 5 in the sheet of fabric 7. The reaction mixture has a viscosity of around 400 cp as it leaves the coating unit 10. It is applied at a rate of about 17 kg per minute. The mixture begins to foam simultaneously on two fronts, namely in the corrugations 5 and on the sheet of fabric 7. Before the foaming front in the corrugations 5 reaches the sheet of fabric 7 lying over the corrugations, its meshes have been at least partly closed by the mixture foaming on the sheet of fabric to such an extent that only a small proportion of the foam ascending from the corrugations 5 is able to pass through. At the same time, the sheet of fabric 7 is lifted by the rising foam to a limited extent over the corrugations 5. In the meantime, an upper cover layer 12 has also been run in below the upper belt 11 of the double conveyor belt 2 from a supply roll 13. During foaming, this upper cover layer 11, which in the present case consists simply of paper, is pressed against the upper belt 11, a firm bond being established between the cover layer 12 and the foam core 14. A laminate is ultimately released from the double conveyor belt 2 at a rate of 5 meters per minute, its foam core 14 being distinguished by particularly high homogeneity and its upper cover layer 12 by a high level of evenness.

The foamable reaction mixture is preferably one which will react to form a polyurethane, polyurea or polyisocyanurate foam. The various foamable reaction mixtures disclosed in the book "Polyurethanes: Chemistry and Technology" by Saunders and Frisch published by Interscience Publishing Company for making rigid foams may be used. The laminated product provided by the invention may be used as wall panels roof plates, facings, jackets or the like.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the continuous production of a double laminate, comprising the steps of:
   introducing onto the lower run of a double conveyor a lower cover layer with recesses;
   distributing onto said lower cover layer a foamable reaction mixture; and
   introducing onto the upper run of said double conveyor an upper cover layer;
   said foamable reaction mixture expanding up to said upper cover layer to form a laminate;
   the improvement wherein a sheet of material which is permeable to the mixture is placed on said lower cover layer before the mixture is applied whereby said permeable sheet acts as a control in providing for even foam distribution throughout the resultant foam core.

2. The process of claim 1 wherein the permeable sheet is fixed to the lower cover layer.

3. The process of claim 1 wherein the permeable sheet is a perforated film, a mesh fabric, a knitted fabric or a coarse fiber-based nonwoven fabric.

4. The product of the process of claim 1.

5. In the process of claim 1 the further improvement wherein the foamable reaction mixture is one which will form a foam selected from the group consisting of polyurethane foam, polyurea foam, polyisocyanurate foam and a mixture of these foams.

6. A process for making a laminate comprising the steps of:
   continuously forming longitudinally extending ribs in a substantially impermeable sheet;
   disposing a permeable web over said impermeable sheet;
   placing a foamable reaction mixture on said web;
   placing an upper cover layer on said liquid covered web; and
   passing the assembly between spaced endless belts which limit the expansion of the foamable reaction mixture;
   the process parameters being such that the foam adjacent the upper cover layer is evenly distributed and adheres well to said upper cover layer.

* * * * *